(12) United States Patent
Tsuchida et al.

(10) Patent No.: US 12,135,075 B2
(45) Date of Patent: Nov. 5, 2024

(54) WORK VEHICLE

(71) Applicant: KUBOTA CORPORATION, Osaka (JP)

(72) Inventors: Tomonari Tsuchida, Osaka (JP); Ryoma Iwase, Osaka (JP); Tomoyuki Tanaka, Osaka (JP); Takahiro Matsuo, Osaka (JP); Hiroyuki Aikawa, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 114 days.

(21) Appl. No.: 17/987,296

(22) Filed: Nov. 15, 2022

(65) Prior Publication Data

US 2023/0204093 A1    Jun. 29, 2023

(30) Foreign Application Priority Data

Dec. 24, 2021    (JP) .................... 2021-210105

(51) Int. Cl.
    *F16H 57/02*      (2012.01)
    *F16H 1/28*       (2006.01)
    (Continued)

(52) U.S. Cl.
    CPC ......... *F16H 57/02* (2013.01); *F16H 37/0813* (2013.01); *F16H 57/0408* (2013.01);
    (Continued)

(58) Field of Classification Search
    CPC .................. F16H 57/0408; F16H 2057/02008
    See application file for complete search history.

(56) References Cited

U.S. PATENT DOCUMENTS 4,739,678 A * 4/1988 Miura ................. F16H 57/0483
                                          74/467
2006/0189431 A1* 8/2006 Selva, Jr. ............ F16H 57/0483
                                         475/198

(Continued)

FOREIGN PATENT DOCUMENTS

CN       106812923 A   *   6/2017
DE     2014 204 088 A1    9/2015
(Continued)

OTHER PUBLICATIONS

European Search Report issued May 17, 2023 in European family member application No. 22 21 0385.

(Continued)

*Primary Examiner* — Daniel D Yabut
(74) *Attorney, Agent, or Firm* — Greenblum & Bernstein, P.L.C.

(57) ABSTRACT

There is provided a work vehicle including an oil outlet port and a partition part. The oil outlet port opens to a bottom portion in one end side of a transmission case in a vehicle body front-back direction and a vehicle body left-right direction. The oil outlet port takes out a lubricating oil from an interior of the transmission case. The partition part divided an internal space of the transmission case into a first space zone along a sidewall portion of the transmission case, and a second space zone other than the first space zone. The partition part brings the first space zone into a sealed state.

5 Claims, 8 Drawing Sheets

(51) Int. Cl.
    *F16H 37/08*     (2006.01)
    *F16H 57/04*     (2010.01)

(52) U.S. Cl.
    CPC ...... *F16H 1/28* (2013.01); *F16H 2057/02008* (2013.01); *F16H 2057/02026* (2013.01); *F16H 2057/02043* (2013.01)

(56) References Cited

U.S. PATENT DOCUMENTS

| | | |
|---|---|---|
| 2007/0169583 A1 | 7/2007 | Reis et al. |
| 2014/0026988 A1 | 1/2014 | Peterson et al. |
| 2015/0007691 A1* | 1/2015 | Schnurr .............. F16H 57/0447 74/606 R |
| 2021/0156465 A1 | 5/2021 | Gyarmati et al. |
| 2021/0270360 A1* | 9/2021 | Asano ................. F16H 57/0408 |
| 2021/0364074 A1* | 11/2021 | Hirase .................... B60K 17/10 |

FOREIGN PATENT DOCUMENTS

| | | |
|---|---|---|
| JP | H08-132898 A | 5/1996 |
| JP | 2004-270819 A | 9/2004 |
| JP | 2019-95058 A | 6/2019 |
| JP | 2021-054392 A | 4/2021 |

OTHER PUBLICATIONS

Japanese Notice of Reasons for Refusal in counterpart Japanese Application No. 2021-210105, dated Jul. 23, 2024 (along with translation thereof).

* cited by examiner

WORK VEHICLE

TECHNICAL FIELD

The present invention relates to a work vehicle.

BACKGROUND ART

There are some work vehicles including a gear transmission that vary power from a power source and outputs the power to a traveling device, and a transmission case that contains the gear transmission therein. Examples of work vehicles of this type include a tractor discussed in Patent Literature 1. The tractor includes a transmission case and a gear transmission (transmission device) contained in the transmission case.

CITATION LIST

Patent Literature

Patent Literature 1

Japanese Unexamined Patent Application Publication, Kokai, No. 2019-95058

SUMMARY OF INVENTION

Technical Problem

In some cases, the work vehicle includes an oil outlet port opening to a bottom portion of the transmission case, and is configured so that a lubricating oil stored in the transmission case can be taken out from the oil outlet port. At that time, if a vehicle body is inclined and the transmission case is inclined, the lubricating oil stored in an interior of the transmission case flows toward a side opposite to a side where the oil outlet port is located. Then, if only a part of the oil outlet port is located above an oil surface due to a decrease in the amount of the lubricating oil remaining at a portion where the oil outlet port is located, air may be sucked by a pump connected to the oil outlet port, or the like.

The present invention provides a work vehicle making it possible to take out the lubricating oil while ensuring that the air is less likely to be sucked from the oil outlet port even when the vehicle body is inclined, by employing measures that is easy to carry out while maintaining rigidity of the transmission case.

Solution to Problem

A work vehicle in one embodiment of the present invention includes a gear transmission, a transmission case and an oil outlet port. The gear transmission is configured to vary power from a power source and output the power to a traveling device. The transmission case contains the gear transmission therein. The oil outlet port opens to a bottom portion in one end side of the transmission case in a vehicle body front-back direction. The oil outlet port is configured to take out a lubricating oil from an interior of the transmission case. The work vehicle includes a partition part dividing an internal space of the transmission case into a first space zone along a sidewall portion of the transmission case, and a second space zone other than the first space zone on another end side in the vehicle body front-back direction of the transmission case. The partition part brings the first space zone into a sealed state.

With this configuration, the lubricating oil does not enter the first space zone in the sealed state. Therefore, even if the transmission case is inclined in the vehicle body front-back direction due to a longitudinal inclination of the vehicle body, and the lubricating oil flows from the side where the oil outlet port is located toward an opposite side, the amount of the lubricating oil staying on the side opposite to the side where the oil outlet port is located becomes smaller than in cases where the first space zone is not present. Consequently, the amount of the lubricating oil remaining at the location where the oil outlet port is located increases. That is, even if the vehicle body is inclined in the longitudinal direction when the lubricating oil is taken out of the transmission case, the oil outlet port is less likely to be located above an oil surface, thereby preventing air from being sucked from the oil outlet port.

Additionally, the first space zone in the internal space of the transmission case is brought into the sealed state by separating from the second space zone. It is therefore possible to take simple measures only by adding the partition part. It is also possible to maintain rigidity of the transmission case because there is no need to decrease an outer diameter of the transmission case in order to decrease the internal space of the transmission case on the side opposite to the side where the oil outlet port of the transmission case is located.

A work vehicle in another embodiment of the present invention includes a gear transmission, a transmission case and an oil outlet port. The gear transmission is configured to vary power from a power source and output the power to a traveling device. The transmission case contains the gear transmission therein. The oil outlet port opens to a bottom portion in one end side of the transmission case in a vehicle body left-right direction. The oil outlet port is configured to take out a lubricating oil from an interior of the transmission case. The work vehicle includes a partition part dividing an internal space of the transmission case into a first space zone along a sidewall portion of the transmission case, and a second space zone other than the first space zone on another end side in the vehicle body left-right direction of the transmission case. The partition part brings the first space zone into a sealed state.

With this configuration, the lubricating oil does not enter the first space zone in the sealed state. Therefore, even if the transmission case is inclined in the left-right direction due to a left/right inclination of the vehicle body, and the lubricating oil flows from the side where the oil outlet port is located toward an opposite side, the amount of the lubricating oil staying on the side opposite to the side where the oil outlet port is located becomes smaller than in cases where the first space zone is not present. Consequently, the amount of the lubricating oil remaining at the location where the oil outlet port is located increases. That is, even if the vehicle body is inclined in the left-right direction when the lubricating oil is taken out of the transmission case, the oil outlet port is less likely to be located above an oil surface, thereby preventing air from being sucked from the oil outlet port.

Additionally, the first space zone in the internal space of the transmission case is brought into the sealed state by separating from the second space zone. It is therefore possible to take simple measures only by adding the partition part. It is also possible to maintain rigidity of the transmission case because there is no need to decrease an outer diameter of the transmission case in order to decrease the internal space of the transmission case on the side opposite to the side where the oil outlet port of the transmission case is located.

A work vehicle in still another embodiment of the present invention includes a gear transmission, a transmission case and an oil outlet port. The gear transmission is configured to vary power from a power source and output the power to a traveling device. The transmission case contains the gear transmission therein. The oil outlet port opens to a bottom portion in one end side of the transmission case in the vehicle body front-back direction and the vehicle body left-right direction. The oil outlet port is configured to take out a lubricating oil from an interior of the transmission case. The work vehicle includes a partition part dividing an internal space of the transmission case into a first space zone along a sidewall portion of the transmission case, and a second space zone other than the first space zone on another end side in the vehicle body front-back direction and the vehicle body left-right direction of the transmission case. The partition part brings the first space zone into a sealed state.

With this configuration, the lubricating oil does not enter the first space zone in the sealed state. Therefore, in cases where the transmission case is inclined in the vehicle body front-back direction due to a longitudinal inclination of the vehicle body, and is inclined in the left-right direction due to a left/right inclination of the vehicle body, even if the lubricating oil flows from the side where the oil outlet port is located toward an opposite side, the amount of the lubricating oil staying on the side opposite to the side where the oil outlet port is located becomes smaller than in cases where the first space zone is not present. Consequently, the amount of the lubricating oil remaining at the location where the oil outlet port is located increases. That is, even if the vehicle body is inclined in the vehicle body front-back direction or the left-right direction when the lubricating oil is taken out of the transmission case, the oil outlet port is less likely to be located above an oil surface, thereby preventing air from being sucked from the oil outlet port.

Additionally, the first space zone in the internal space of the transmission case is brought into the sealed state by separating from the second space zone. It is therefore possible to take simple measures only by adding the partition part. It is also possible to maintain rigidity of the transmission case because there is no need to decrease an outer diameter of the transmission case in order to decrease the internal space of the transmission case on the side opposite to the side where the oil outlet port of the transmission case is located.

In the present invention, the gear transmission preferably includes a planetary gear device configured to vary power from the power source and output the power, and a clutch disposed displacedly to a side where the sidewall portion is located relative to the planetary gear device, on a location closer to a side where the oil outlet port is located than the planetary gear device. Output of the planetary gear device is inputted to the clutch. The first space zone is preferably disposed at a location located on a lateral side of the planetary gear device, on a location closer to a side where the planetary gear device is located than the clutch.

With this configuration, the transmission case is formed in a state where the sidewall portion of the transmission case passes in the front-back direction on a lateral outer side of the clutch, and dead space formed on the lateral side of the planetary gear device is used for the first space zone. It is therefore easy to form the first space zone.

In the present invention, a differential mechanism configured to transmit output of the gear transmission to the traveling device is preferably contained on one end side of the transmission case in the vehicle body front-back direction.

With this configuration, even if the vehicle body is inclined in the front-back direction, and the lubricating oil flows toward a side opposite to the side where the oil outlet port is located, the amount of the lubricating oil remaining on one end side in the front-back direction of the transmission case is larger than that in the case where there is no first space zone in the sealed state. Consequently, the differential mechanism remains entering deeply the lubricating oil, and the differential mechanism can be lubricated and cooled.

In the present invention, the oil outlet port is preferably disposed at an upper portion and a lower portion in the bottom portion. The bottom portion preferably includes a communication chamber formation member disposed on an outer surface of a sidewall portion of the transmission case. The communication chamber formation member is preferably configured to form a communication chamber between itself and the sidewall portion. The oil outlet port at the upper portion preferably opens to an upper portion of the communication chamber formation member. The oil outlet port at the lower portion preferably opens to a lower portion of the communication chamber formation member. A communication hole allowing the communication chamber to communicate with an internal space of the transmission case preferably opens to a portion of the sidewall portion which is opposed to the oil outlet port at the lower portion.

With this configuration, the oil outlet port at the lower portion communicates with the internal space of the transmission case via the communication chamber and the communication hole. The oil outlet port at the upper portion communicates with the internal space of the transmission case via the communication chamber and the communication hole. Therefore, though the oil outlet port at the upper portion is disposed at a higher position than the oil outlet port at the lower portion, a height position of a portion where the oil outlet port at the lower portion takes out the oil in the internal space of the transmission case can be made identical with a height position of a portion where the oil outlet port at the upper portion takes out the oil in the internal space of the transmission case.

DESCRIPTION OF EMBODIMENTS

An embodiment of the present invention is described with reference to the drawings.

Figure 1:
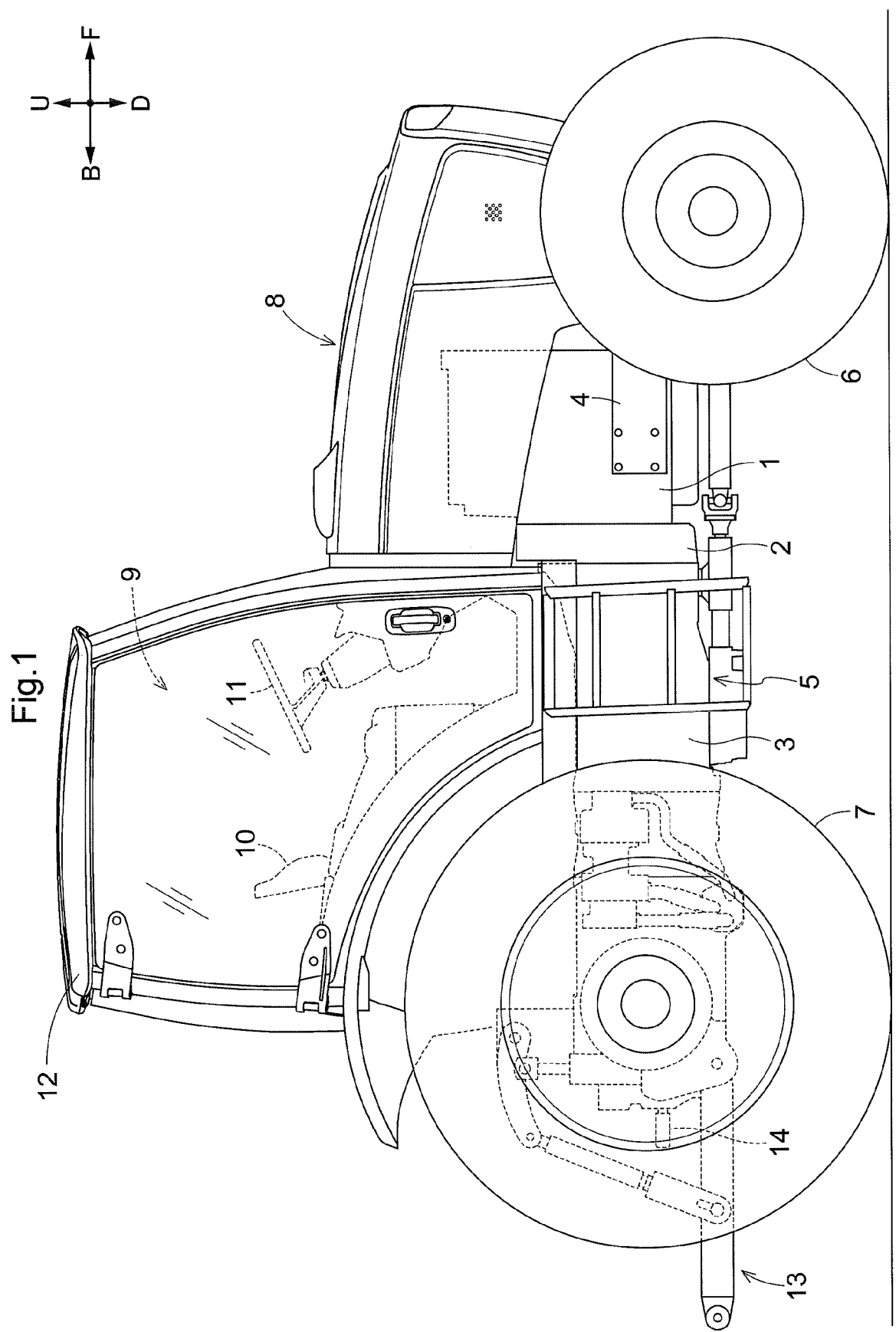
FIG. 1 is a side view illustrating an entirety of a tractor.
Figure 4:
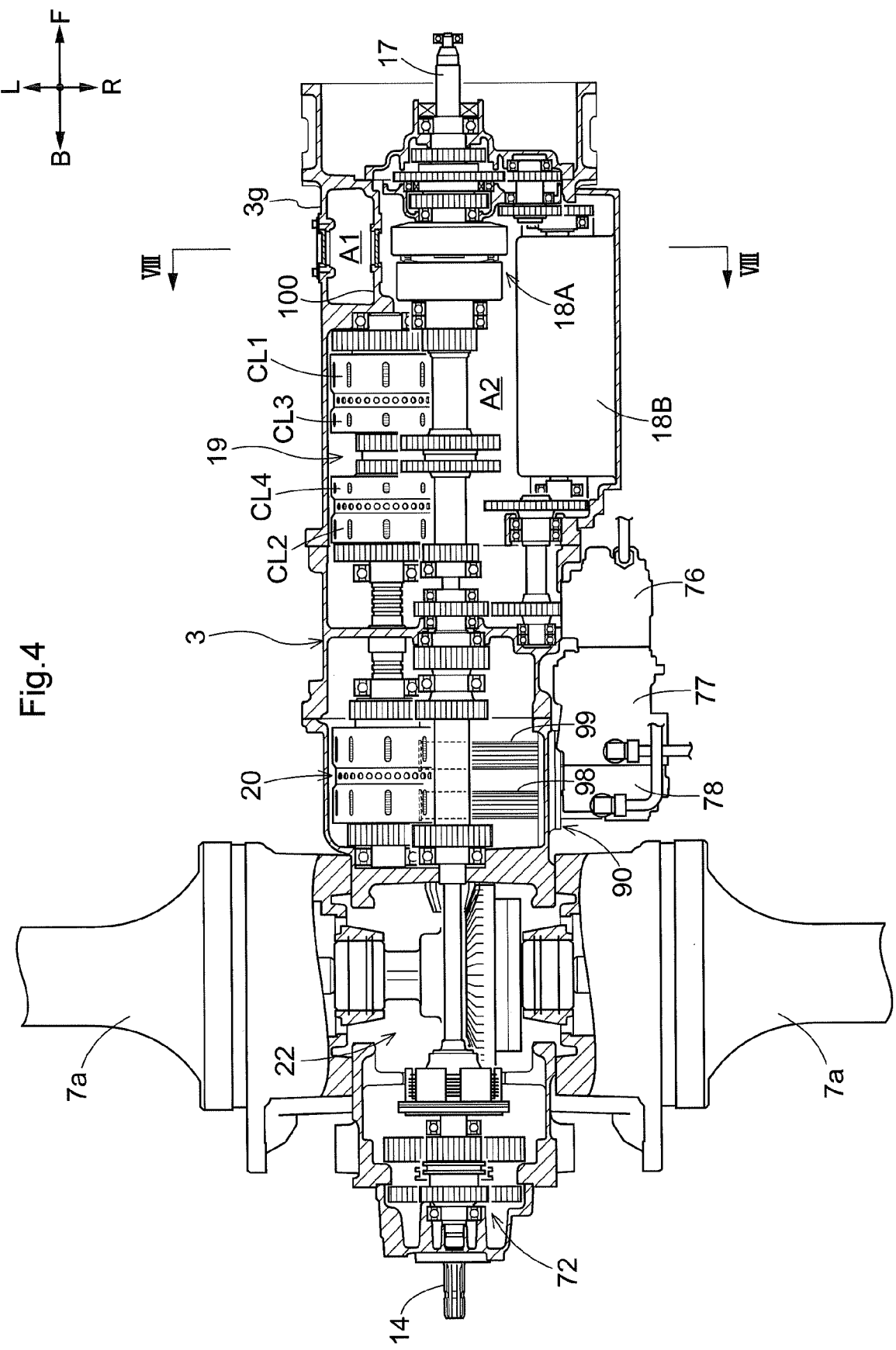
FIG. 4 is a sectional view of a transmission case.
Figure 5:
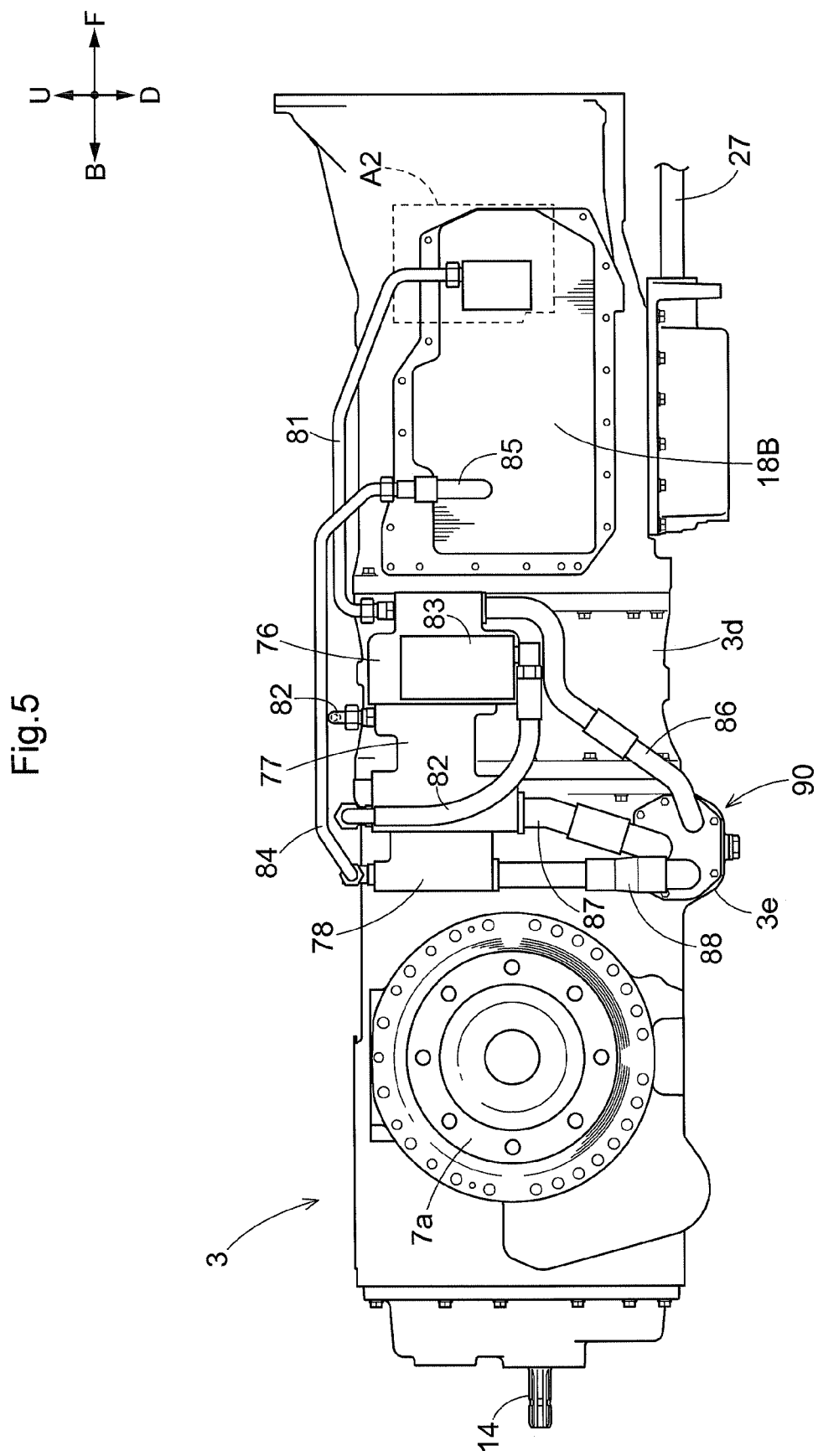
FIG. 5 is a side view illustrating the transmission case.

The following description relates to a traveling vehicle body of a tractor (an example of "work vehicles"). In FIGS. 1, 4, and 5, and the like, a direction of an arrow F is "front vehicle body," a direction of an arrow B is "rear vehicle body," a direction of an arrow U is "above vehicle body," a direction of an arrow D is "below vehicle body," a direction of an arrow L is "left vehicle body" and a direction of an arrow R is "right vehicle body."

[Overall Configuration of Tractor]

As illustrated in FIG. 1, the traveling vehicle body of the tractor includes an engine 1, a transmission case 3, a vehicle body frame 5, a pair of left and right front wheels 6 and a pair of left and right rear wheels 7. A front portion of the transmission case 3 is connected to a flywheel housing 2 disposed in a rear portion of the engine 1. The vehicle body frame 5 is configured by, for example, a front frame 4 connected to a lower portion of the engine 1. The front wheels 6 are traveling devices disposed at a front portion of the vehicle body frame 5 so as to be steerably and drivably. The rear wheels 7 are traveling device disposed drivably at a rear portion of the vehicle body frame 5. The tractor includes a driving section 8 including the engine 1, which is disposed at a front portion of the traveling vehicle body. The tractor includes an operation section 9 at a rear portion of the traveling vehicle body. The operation section 9 includes an operation seat 10, a steering wheel 11 to perform steering operation of the front wheels 6, and a cabin 12 to cover a boarding space. The tractor includes a link mechanism 13 and a power take-off shaft 14. The link mechanism 13 connects various types of working devices, such as a rotary tiller (not illustrated), to a rear portion of the vehicle body frame 5 so that they can be subjected to a lifting operation. The power take-off shaft 14 transmits power from the engine 1 to the working devices being connected.

[Power Transmission Device]

Figure 2:
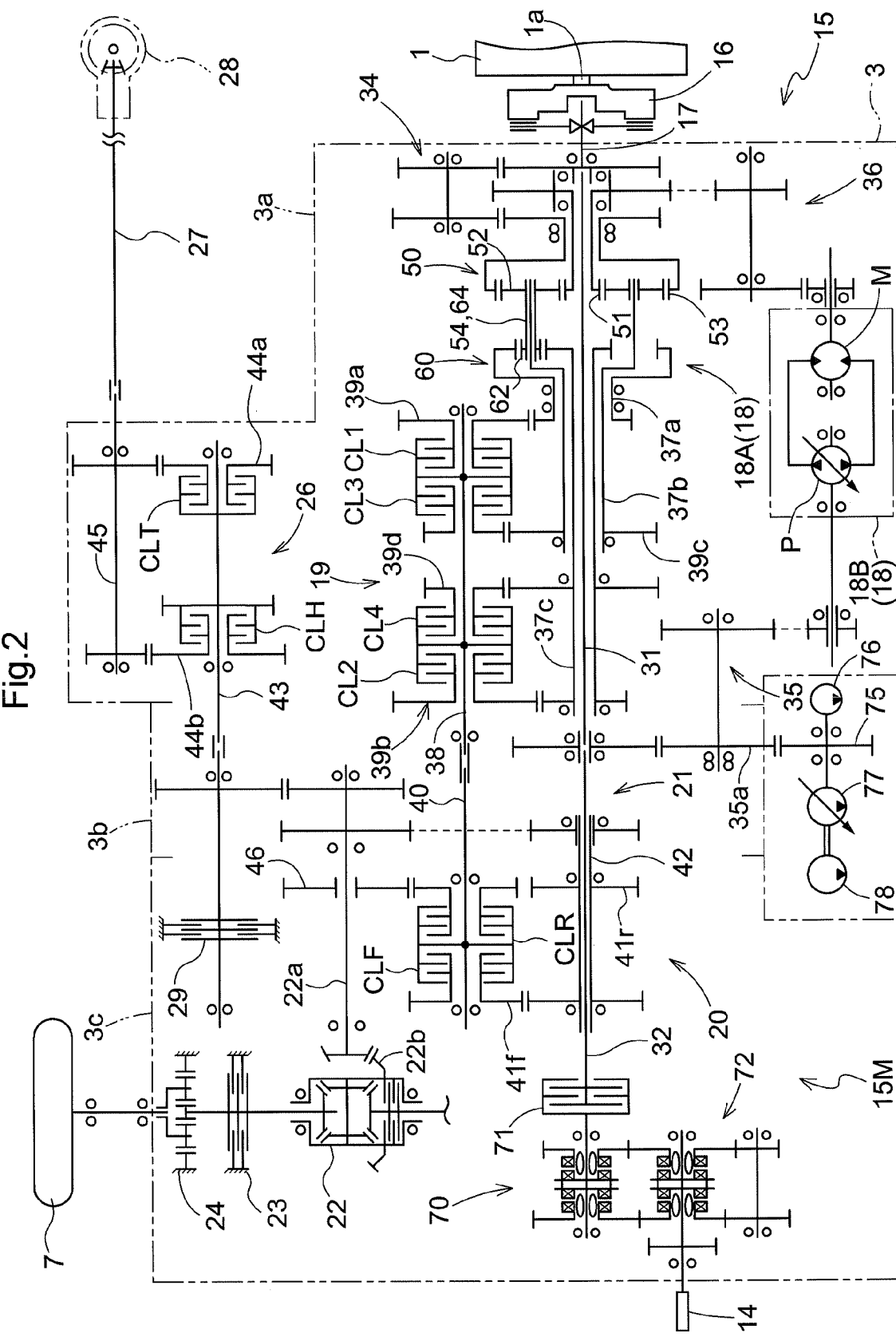
FIG. 2 is a diagram of a power transmission device.

FIG. 2 is a diagram illustrates a power transmission device 15 that transmits the power of the engine 1 to the front wheels 6, the rear wheels 7, and the power take-off shaft 14. As illustrated in FIGS. 1 and 2, the power transmission device 15 includes the transmission case 3 whose front portion is connected to the flywheel housing 2 disposed in the rear portion of the engine 1. The transmission case 3 is disposed in the traveling vehicle body in a state where a front-back direction of the transmission case 3 coincides with a front-back direction of the traveling vehicle body as illustrated in FIG. 1. The transmission case 3 is configured so as to be divisible into a front case part 3a, an intermediate case part 3b, and a rear case part 3c. A front portion of the front case part 3a is connected to the flywheel housing 2. The intermediate case part 3b is connected to a rear portion of the front case part 3a. A front portion of the rear case part 3c is connected to a rear portion of the intermediate case part 3b.

As illustrated in FIG. 2, the transmission case 3 contains therein a gear transmission 15M to which the power from the engine 1 that is a power source is inputted and from which the inputted power whose varied by the transmission case 3 is outputted to the front wheels 6 and the rear wheels 7, a rear wheel differential mechanism 22 (corresponding to the differential mechanism), and an operation power transmission device 70 to transmit the power from the engine 1 to the power take-off shaft 14.

The gear transmission 15M includes an input shaft 17, a major transmission part 18, a staged transmission part 19, a forward-reverse switching device 20, a first gear interlock mechanism 21, and a front wheel transmission device 26 as illustrated in FIG. 2. Power of an output shaft 1a of the engine 1 is transmitted via a major clutch 16 to the input shaft 17, and the input shaft 17 inputs the transmitted power to the transmission case 3. The major transmission part 18 is connected to the input shaft 17. Output of the major transmission part 18 is inputted to the staged transmission part 19. Output of the staged transmission part 19 is inputted to the forward-reverse switching device 20. The first gear interlock mechanism 21 transmits output of the forward-reverse switching device 20 to the rear wheel differential mechanism 22. The output of the forward-reverse switching device 20 is transmitted via the first gear interlock mechanism 21 to the front wheel transmission device 26.

The major transmission part 18 includes a planetary gear device 18A and a continuously variable transmission device 18B as illustrated in FIG. 2.

The planetary gear device 18A includes two planetary gear device sections disposed side by side in the front-back direction of the transmission case 3. Hereinafter, a description is given where one of these two planetary gear device sections which is disposed on a front side is referred to as a first planetary gear device section 50, and one of these two planetary gear device sections which is disposed on a rear side is referred to as a second planetary gear device section 60.

The first planetary gear device section 50 includes a planetary gear 52 and a transmission gear (not illustrated) that meshes with the planetary gear 52. The second planetary gear device section 60 includes a planetary gear 62. A coupling member (not illustrated) that interlockingly couples the transmission gear and the planetary gear 62 is disposed across the first planetary gear device section 50 and the second planetary gear device section 60. A carrier 54 of the first planetary gear device section 50 and a carrier 64 of the second planetary gear device section 60 are integrally rotatably coupled to each other. With this configuration, the planetary gear device 18A is configured as a complex planetary gear device.

The continuously variable transmission device 18B is configured by a hydrostatic continuously variable transmission device, and includes a variable displacement hydraulic pump P and a hydraulic motor M.

Power of the input shaft 17 is inputted via a front rotating shaft 31 and a second gear interlock mechanism 35 to the hydraulic pump P in the major transmission part 18. By performing a gear shift operation to change a swash plate angle of the hydraulic pump P in the continuously variable transmission device 18B, the inputted power is shifted to forward rotation power and reverse rotation power, and the forward rotation power and the reverse rotation power are shifted steplessly. The shifted power is outputted from the hydraulic motor M. Output of the continuously variable transmission device 18B is inputted via a third gear interlock mechanism 36 to a sun gear 51 of the first planetary gear device section 50. Power of the input shaft 17 is inputted via a fourth gear interlock mechanism 34 to an internal gear 53 of the first planetary gear device section 50. Power transmitted from the engine 1 via the continuously variable transmission device 18B, and power transmitted from the engine 1 not via the continuously variable transmission device 18B are synthesized by the first planetary gear device section 50 and the second planetary gear device section 60 in the planetary gear device 18A. Synthetic power is outputted from a first output shaft 37a, a second output shaft 37b, and a third output shaft 37c included in the second planetary gear device section 60.

[Staged Transmission Part]

The staged transmission part 19 includes four staged clutches to which the synthetic power from the planetary gear device 18A, and an output shaft 38 as illustrated in FIG. 2. These four staged clutches are a first clutch CL1, a second clutch CL2, a third clutch CL3, and a fourth clutch CL4 illustrated in FIG. 2, which are disposed on the output shaft 38.

The synthetic power from the planetary gear device 18A is staged in four speed ranges and then outputted from the output shaft 38 by appropriate operations of the continuously variable transmission device 18B and the four staged clutches (the first clutch CL1, the second clutch CL2, the third clutch CL3, and the fourth clutch CL4) in the staged transmission part 19.

Figure 3:
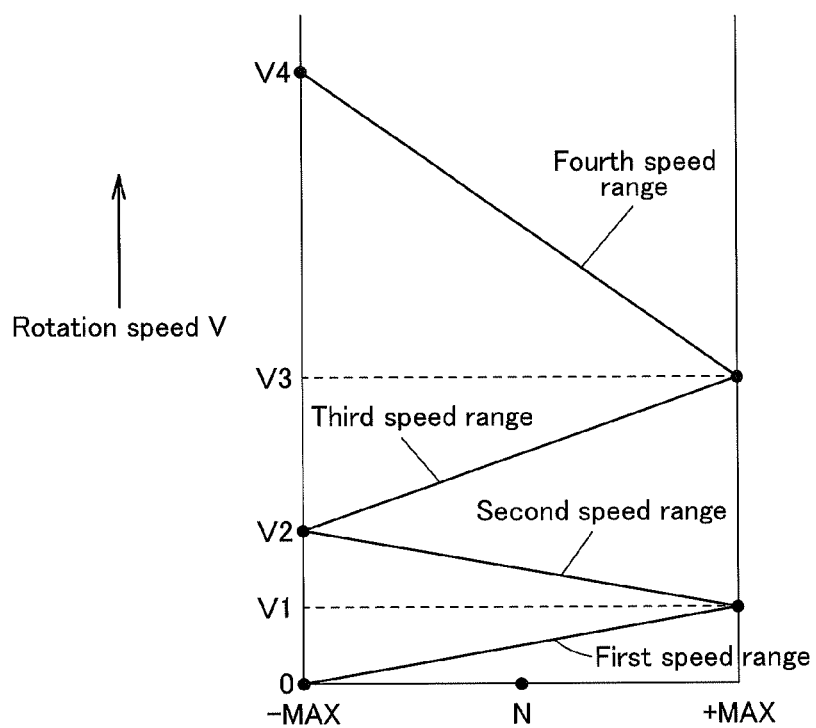
FIG. 3 is an explanatory drawing illustrating a relationship among a transmission state of a continuously variable transmission, a speed range, and a rotational velocity of an output shaft of a staged transmission.

FIG. 3 is an explanatory drawing illustrating a relationship among a speed change state of the continuously variable transmission device 18B, a speed range and a rotational velocity V of the output shaft 38 of the staged transmission part 19. An ordinate in FIG. 3 represents the rotational velocity V of the output shaft 38. An abscissa in FIG. 3 represents the speed change state of the continuously variable transmission device 18B, in which "N" represents a neutral state, "−MAX" represents a speed change state at a maximum speed in a reverse rotation direction, and "+MAX" represents a speed change state at a maximum speed in a forward rotation direction.

If the first clutch CL1 of the four staged clutches is brought into an engaged state and the continuously variable transmission device 18B is subjected to a gear shift operation, the power of the first output shaft 37a is varied by a first speed gear interlock mechanism 39a and the first clutch CL1, and the varied power is outputted from the output shaft 38. As illustrated in FIG. 3, the rotational velocity V of the output shaft 38 reaches a rotational velocity of a first speed range, and the rotational velocity V of the output shaft 38 increases steplessly from a velocity "0" to the maximum velocity "V1" of the first speed range along with a shift from "−MAX" to "+MAX" in the continuously variable transmission device 18B.

If the second clutch CL2 of the four staged clutches is brought into an engaged state and the continuously variable transmission device 18B is subjected to a gear shift operation, the power of the third output shaft 37c is varied by a second speed gear interlock mechanism 39b and the second clutch CL2, and the varied power is outputted from the output shaft 38. As illustrated in FIG. 3, the rotational velocity V of the output shaft 38 reaches a higher rotational velocity of a second speed range than the first speed range, and the rotational velocity V of the output shaft 38 increases steplessly from a minimum velocity "V1" of the second speed range to the maximum velocity "V2" of the second speed range along with a shift from "+MAX" to "−MAX" in the continuously variable transmission device 18B.

If the third clutch CL3 of the four staged clutches is brought into an engaged state and the continuously variable transmission device 18B is subjected to a gear shift operation, the power of the second output shaft 37b is varied by a third speed gear interlock mechanism 39c and the third clutch CL3, and the varied power is outputted from the output shaft 38. As illustrated in FIG. 3, the rotational velocity V of the output shaft 38 reaches a higher-side rotational velocity of a third speed range than the second speed range, and the rotational velocity V of the output shaft 38 increases steplessly from a minimum velocity "V2" of the third speed range to the maximum velocity "V3" of the third speed range along with a shift from "−MAX" to "+MAX" in the continuously variable transmission device 18B.

If the fourth clutch CL4 of the four staged clutches is brought into an engaged state and the continuously variable transmission device 18B is subjected to a gear shift operation, the power of the third output shaft 37c is varied by the fourth speed gear interlocking mechanism 39d and the fourth clutch CL4, and the varied power is outputted from the output shaft 38. As illustrated in FIG. 3, the rotational velocity V of the output shaft 38 reaches a higher-side rotational velocity of a fourth speed range than the third speed range, and the rotational velocity V of the output shaft 38 increases steplessly from a minimum velocity "V3" of the fourth speed range to the maximum velocity "V4" of the fourth speed range along with a shift from "+MAX" to "−MAX" in the continuously variable transmission device 18B.

[Forward-Reverse Switching Device]

As illustrated in FIG. 2, the forward-reverse switching device 20 includes an input shaft 40 connected to the output shaft 38 of the staged transmission part 19, a forward clutch CLF and a reverse clutch CLR disposed on the input shaft 40, and an output shaft 42. The output shaft 42 is connected via a forward gear mechanism 41f to the forward clutch CLF, and is connected via a reverse gear mechanism 41r to the reverse clutch CLR. As illustrated in FIG. 2, the reverse gear mechanism 41r includes a reverse gear 46 configured to mesh with a tooth part of an output rotary member of the reverse clutch CLR. The reverse gear 46 is relatively rotatably supported on an input shaft 22a of the rear wheel differential mechanism 22.

In the forward-reverse switching device 20, if the forward clutch CLF is brought into an engaged state, power transmitted from the staged transmission part 19 to the input shaft 40 is converted to forward movement power by the forward clutch CLF and the forward gear mechanism 41f, and the forward movement power is outputted from the output shaft 42. If the reverse clutch CLR is brought into an engaged state, power transmitted from the staged transmission part 19 to the input shaft 40 is converted to reverse movement power by the reverse clutch CLR and the reverse gear mechanism 41r, and the reverse movement power is outputted from the output shaft 42. The forward movement power and the reverse movement power outputted from the output shaft 42 are transmitted to the first gear interlock mechanism 21 and are then transmitted to the input shaft 22a of the rear wheel differential mechanism 22 by the first gear interlock mechanism 21.

[Rear Wheel Differential Mechanism]

The forward movement power and the reverse movement power outputted from the forward reverse switching device 20 are inputted via the first gear interlock mechanism 21 to the input shaft 22a, and the rear wheel differential mechanism 22 outputs the inputted powers to the left and right rear wheels 7. Output of the rear wheel differential mechanism 22 is transmitted via a reduction device 24 to the rear wheels 7. The reduction device 24 is configured by a planetary gear device. A steering brake 23 is disposed on a transmission system from the rear wheel differential mechanism 22 to the rear wheels 7.

[Front Wheel Transmission Device]

The front wheel transmission device 26 includes an input shaft 43, a constant velocity clutch CLT and a speed-up clutch CLH disposed on the input shaft 43, and an output shaft 45 as illustrated in FIG. 2. The forward movement power and the reverse movement power from the forward reverse switching device 20 are transmitted via the first gear interlock mechanism 21 to the input shaft 43. The output shaft 45 is connected via a constant velocity gear mechanism 44a to the constant velocity clutch CLT, and is connected via a speed-up gear mechanism 44b to the speed-up clutch CLH. A parking brake 29 is connected to the input shaft 43.

If the constant velocity clutch CLT is brought into an engaged state in the front wheel transmission device 26, power transmitted from the forward reverse switching device 20 to the input shaft 43 is transmitted via the constant velocity clutch CLT and the constant velocity gear mechanism 44*a* to the output shaft 45, and the power is transmitted from the output shaft 45 via a rotating shaft 27 to the front wheel differential mechanism 28. This leads to a situation where the pair of left and right front wheels 6 and the pair of left and right rear wheels 7 are driven in a state where an average peripheral speed of the pair of left and right front wheels 6 is approximately equal to an average peripheral speed of the pair of left and right rear wheels 7, namely, a so-called four-wheel drive state at an equal velocity of the front and rear wheels. If the speed-up clutch CLH is brought into an engaged state, power transmitted from the forward reverse switching device 20 to the input shaft 43 is transmitted via the speed-up clutch CLH and the speed-up gear mechanism 44*b* to the output shaft 45, and the power is transmitted from the output shaft 45 to the front wheel differential mechanism 28. This leads to a situation where the pair of left and right front wheels 6 and the pair of left and right rear wheels 7 are driven in a state where the average peripheral speed of the pair of left and right front wheels 6 is higher than the average peripheral speed of the pair of left and right rear wheels 7, specifically, a so-called four-wheel drive state where the front wheels have a higher speed.

[Operation Power Transmission Device]

The operation power transmission device 70 is connected via the front rotating shaft 31 and a rear rotating shaft 32 to the input shaft 17 as illustrated in FIG. 2. The operation power transmission device 70 includes an operation clutch 71 (corresponding to a clutch) to which power from the engine 1 is inputted, and an operation power transmission mechanism 72 that varies the output of the operation clutch 71 and transmits the output to the power take-off shaft 14. The front rotating shaft 31 is disposed behind the input shaft 17 so as to be located on the same straight line as the input shaft 17. The rear rotating shaft 32 is disposed behind the front rotating shaft 31 so as to be located on the same straight line as the front rotating shaft 31.

The operation clutch 71 in the operation power transmission device 70 performs switching between a state where the power from the engine 1 is transmitted to the power take-off shaft 14 and a state where a power transmission from the engine 1 to the power take-off shaft 14 is discontinued. That is, if the operation clutch 71 is switched to an engaged state, the rear rotating shaft 32 and the operation power transmission mechanism 72 are interlockingly connected to each other by the operation clutch 71, so that the power from the input shaft 17 is transmitted to the power take-off shaft 14. If the operation clutch 72 is switched to a disengaged state, the interlocking connection between the rear rotating shaft 32 and the operation power transmission mechanism 72 is disconnected by the operation clutch 71, so that the power transmission from the input shaft 17 to the power take-off shaft 14 is disconnected.

[Oil Outlet Configuration]

As illustrated in FIG. 2, a power take-off gear 75 is configured to be engaged with a transmission gear 35*a* in the second gear interlock mechanism 35 to interlock the front rotating shaft 31 and the hydraulic pump P of the continuously variable transmission device 18B. A first hydraulic pump 76, a second hydraulic pump 77 and a third hydraulic pump 78 are connected to the power take-off gear 75. As illustrated in FIGS. 4 and 5, the first hydraulic pump 76, the second hydraulic pump 77, and the third hydraulic pump 78 are supported on a lateral upper portion of the transmission case 3.

The first hydraulic pump 76 is driven by power that the power take-off gear 75 takes off from the second gear interlock mechanism 35. The first hydraulic pump 76 pumps the lubricating oil stored in the transmission case 3, and supplies, as a hydraulic oil, the pumped lubricating oil to the continuously variable transmission device 18B via a first filler pipe member 81 extending from the first hydraulic pump 76. The second hydraulic pump 77 is driven by power that the power take-off gear 75 takes off from the second gear interlock mechanism 35. The second hydraulic pump 77 pumps the lubricating oil stored in the interior of the transmission case 3, and supplies, as a hydraulic oil, the pumped lubrication oil to the major transmission part 18 and the forward-reverse switching device 20 via a second oil filler pipe member 82 extending from the second hydraulic pump 77 and a preferential switching valve 83. The preferential switching valve 83 is disposed on two lateral portions of the transmission case 3. The third hydraulic pump 78 is driven by power that the power take-off gear 75 takes off from the second gear interlock mechanism 35. The third hydraulic pump 78 pumps the lubricating oil stored in the interior of the transmission case 3. The pumped lubricating oil is fed to a lubrication release valve 85 via a third oil filler pipe member 84 extending from the third hydraulic pump 78, and is then fed into the transmission case 3 as a lubricating oil.

The oil outlet port, which permits pumping the oil from the transmission case 3 by the first hydraulic pump 76, the second hydraulic pump 77, and the third hydraulic pump 78, is formed by opening a bottom portion 3*e* on one end side of the transmission case 3 in a vehicle body front-back direction and a vehicle body left-right direction. If the traveling vehicle body is inclined in a front-back direction, the transmission case 3 enters an inclined state where the other end side in the vehicle body front-back direction (the side opposite to the side where the oil outlet port is located) is lowered. Consequently, the lubricating oil staying in the interior of the transmission case 3 flows from one end side in the vehicle body front-back direction of the transmission case 3 toward the other end side in the vehicle body front-back direction. If the traveling vehicle body is inclined in the left-right direction, the transmission case 3 enters an inclined state where the other end side in the vehicle body left-right direction (the side opposite to the side where the oil outlet port is located) is lowered. Consequently, the lubricating oil staying in the interior of the transmission case 3 flows from one end side of the transmission case 3 in the vehicle body front-back direction toward the other end side in the vehicle body left-right direction. With the present embodiment, a volume of a region where the lubricating oil stays in the interior of the transmission case 3 is made smaller than a volume of the internal space of the transmission case 3 on the other end side of the transmission case 3 in the vehicle body front-back direction and the vehicle body left-right direction. With this configuration, even if the traveling vehicle body is inclined in the front-back direction or in the left-right direction, the amount of the lubricating oil staying in the region where the oil outlet port is located in the transmission case 3 can be increased. This prevents the oil outlet port from being located above the oil surface, thereby preventing the first hydraulic pump 76, the second hydraulic pump 77, and the third hydraulic pump 78 from sucking air through the oil outlet port.

Figure 6:
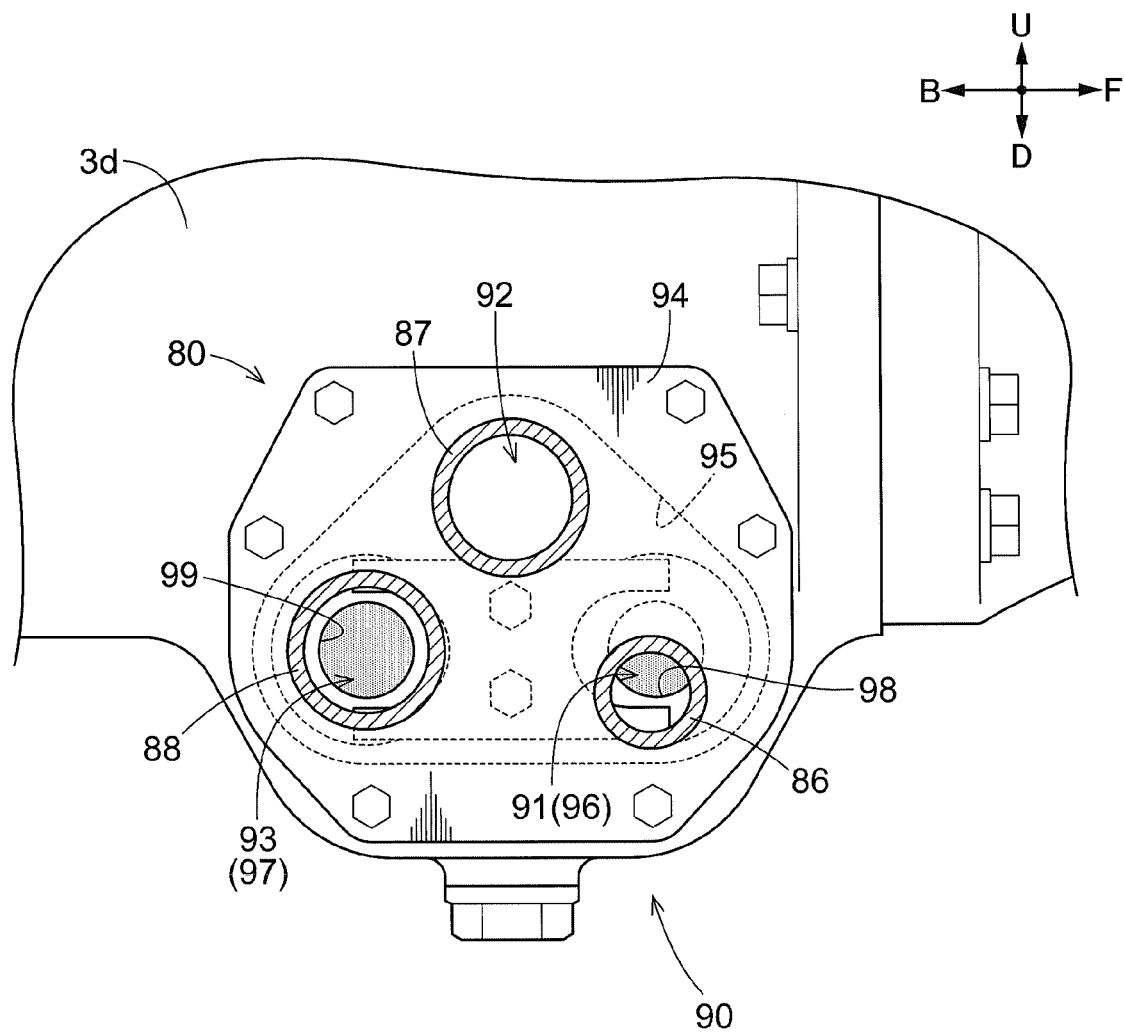
FIG. 6 is a side view illustrating an oil outlet part.

Specifically, as illustrated in FIG. 5, an oil outlet part 90 is disposed at a right lateral portion of the transmission case 3 on a rear end side of the transmission case 3. The oil outlet part 90 is formed at a part of the transmission case 3 which is located ahead of a rear axle case 7a (refer to FIG. 4) extending from the transmission case 3. As illustrated in FIGS. 5 and 6, the oil outlet part 90 includes a first oil output port 91, a second oil outlet port 92, and a third oil outlet port 93, which are configured to take out the lubricating oil from the interior of the transmission case 3, and open into the bottom portion 3e of the transmission case 3. The first oil outlet port 91 is connected to the first hydraulic pump 76 with a first suction pipe member 86 interposed therebetween. The second oil outlet port 92 is connected to the second hydraulic pump 77 with a second suction pipe member 87 interposed therebetween. The third oil outlet port 93 is connected to the third hydraulic pump 78 with a third suction pipe member 88 interposed therebetween. The first oil outlet port 91, the second oil outlet port 92, and the third oil outlet port 93 in the oil outlet part 90 open into the bottom portion 3e of the transmission case 3.

Figure 7:
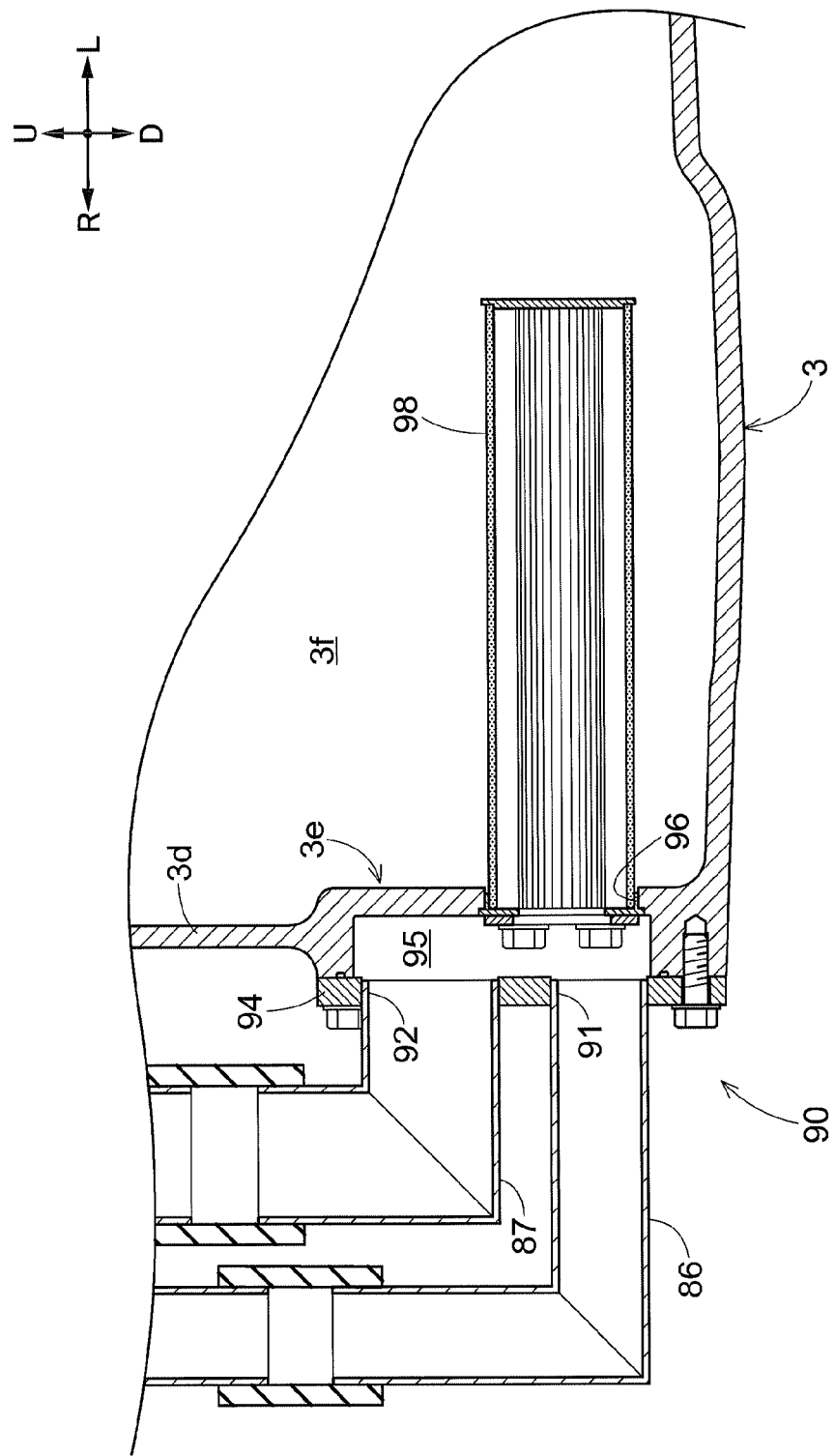
FIG. 7 is a sectional view illustrating the oil outlet part.

As illustrated in FIGS. 6 and 7, the first oil outlet port 91 and the third oil outlet port 93 are individually disposed at lower portions of the bottom portion 3e, and the second oil outlet port 92 is disposed at an upper portion of the bottom portion 3e in the present embodiment.

The bottom portion 3e includes a communication chamber formation member 94 attached to an outer surface of the right sidewall portion 3d of the transmission case 3. The communication chamber formation member 94 is attached to the right sidewall portion 3d in a state where a reentrant space in the right sidewall portion 3d is closed. A communication chamber 95 located between the communication chamber formation member 94 and the right sidewall portion 3d is formed by the communication chamber formation member 94 and the right sidewall portion 3d. The first oil outlet port 91 and the third oil outlet port 93, which are disposed side by side in the vehicle body front-back direction, are opened below the communication chamber formation member 94. The second oil outlet port 92 is opened above the communication chamber formation member 94. The second oil outlet port 92 is located at a higher position than the first oil outlet port 91 and the third oil outlet port 93. The first oil outlet port 91, the second oil outlet port 92 and the third oil outlet port 93 communicate with the communication chamber 95. A first communication hole 96, which allows the communication chamber 95 to communicate with an internal space 3f of the transmission case 3, opens to a portion of the right sidewall portion 3d which is opposed to the first oil outlet port 91. A second communication hole 97, which allows the communication chamber 95 to communicate with the internal space 3f of the transmission case 3, opens to a portion of the right sidewall portion 3d which is opposed to the third oil outlet port 93. The first communication hole 96 includes a first strainer 98, and the second communication hole 97 includes a second strainer 99.

The first oil outlet port 91 communicates with the internal space 3f of the transmission case 3 via the communication chamber 95, the first communication hole 96, the first strainer 98, the second communication hole 97, and the second strainer 99. The second oil outlet port 92 communicates with the internal space 3f of the transmission case 3 via the communication chamber 95, the first communication hole 96, the first strainer 98, the second communication hole 97, and the second strainer 99. The third oil outlet port 93 communicates with the internal space 3f of the transmission case 3 via the communication chamber 95, the second communication hole 97, the second strainer 99, the first communication hole 96, and the first strainer 98.

A connection between the first suction pipe member 86 and the first oil outlet port 91 is made by inserting an end portion of the first suction pipe member 86 into the first oil outlet port 91. The lubricating oil is taken out by the first suction pipe member 86 mainly via the first oil outlet port 91, the communication chamber 95, the first communication hole 96, and the first strainer 98. The lubricating oil can also be taken out by the first suction pipe member 86 via the first oil outlet port 91, the communication chamber 95, the second communication hole 97, and the second strainer 99.

A connection between the third suction pipe member 88 and the third oil outlet port 93 is made by inserting an end portion of the third suction pipe member 88 into the third oil outlet port 93. The lubricating oil is taken out by the third suction pipe member 88 mainly via the third oil outlet port 93, the communication chamber 95, the second communication hole 97, and the second strainer 99. The lubricating oil can also be taken out by the third suction pipe member 88 via the third oil outlet port 93, the communication chamber 95, the first communication hole 96, and the first strainer 98.

A connection between the second suction pipe member 87 and the second oil outlet port 92 is made by inserting an end portion of the second suction pipe member 87 into the second oil outlet port 92. The lubricating oil is taken out by the second suction pipe member 87 via the second oil outlet port 92, the communication chamber 95, the first communication hole 96, the first strainer 98, the second communication hole 97, and the second strainer 99. The second oil outlet port 92 is located at a higher position than the first oil outlet port 91 and the third oil outlet port 93. A height position of a region where the second oil outlet port 92 takes out the lubricating oil in the interior of the transmission case 3 is the same as a height position of a region where the first oil outlet port 91 and the third oil outlet port 93 take out the lubricating oil in the interior of the transmission case 3.

A volume of the region where the lubricating oil stays in the interior of the transmission case 3 is made smaller than a volume of the internal space of the transmission case 3 on a front end side of the transmission case 3 (the side opposite to the side where the first oil outlet port 91, the second oil outlet port 92, and the third oil outlet port 93 are located in the vehicle body front-back direction), and on a left end side of the transmission case 3 (the side opposite to the side where the first oil outlet port 91, the second oil outlet port 92, and the third oil outlet port 93 are located in the vehicle body left-right direction).

Figure 8:
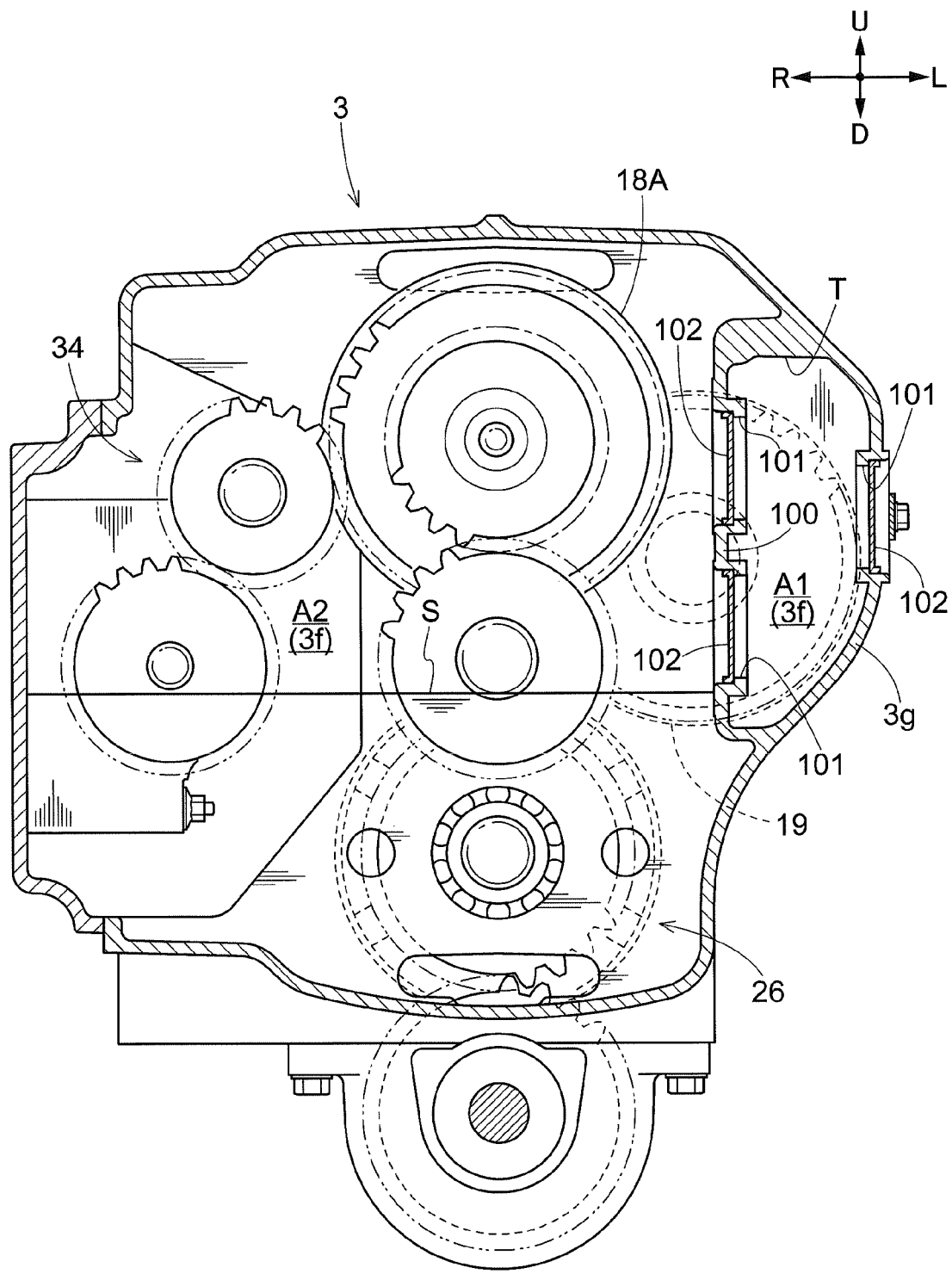
FIG. 8 is a sectional view taken along line VIII-VIII in FIG. 4.

As illustrated in FIGS. 4 and 8, a partition part 100 is disposed in the interior of the transmission case 3, specifically at a region toward the front end of the transmission case 3, namely, at a region located closer to the front of the vehicle body than the oil outlet part 90. The partition part 100 divides the internal space 3f of the transmission case 3 into a first space zone A1 along a left sidewall portion 3g of the transmission case 3 and a second space zone A2 other than the first space zone A1. The first space zone A1 is sealed with the partition part 100 and the left sidewall portion 3g in order to prevent the lubricating oil stored in the interior of the transmission case 3 from entering the first space zone A1. A volume in which the lubricating oil can be stored in the interior of the transmission case 3 at the region toward the front end of the transmission case 3, namely, at the region located closer to the front of the vehicle body than the oil outlet part 90 is smaller than a volume of the internal space 3f at the region toward the front end of the transmission case 3 by the amount of a volume of the first space zone A1.

As illustrated in FIG. 8, the left sidewall portion 3g and the partition part 100 include an opening 101 that enables integral casting of the partition part 100 with the transmission case 3, and a closing member 102 that closes the opening 101 so as to seal the first space zone S1.

The lubricating oil is stored in the internal space 3f of the transmission case 3 so as to lubricate the gear transmission 15M and the rear wheel differential mechanism 22. The lubricating oil is preferably stored in a state where the height position of the oil surface S of the lubricating oil is the same as a height position between the rotation axis of the ring gear 22b of the rear wheel differential mechanism 22 and a lower end of the ring gear 22b. An upper end T of the first space zone A1 is located above the oil surface S.

As described above, if the transmission case 3 enters an inclined state where the front end side of the transmission case 3 in the vehicle body front-back direction is lowered, the lubricating oil staying in the interior of the transmission case 3 flows from the rear end side of the transmission case 3 (the side where the first oil outlet port 91, the second oil outlet port 92, and the third oil outlet port 93 are located) toward the front end side of the transmission case 3 (the side opposite to the side where the first oil outlet port 91, the second oil outlet port 92, and the third oil outlet port 93 are located). Even if the lubricating oil flows toward the front end side of the transmission case 3, the amount of the lubricating oil staying on the front end side of the transmission case 3 becomes smaller under the presence of the first space zone A1 than in the cases where the first space zone A1 is not present. Consequently, the amount of the lubricating oil remaining on the rear end side of the transmission case 3 decreases, and the amount of the lubricating oil remaining on the rear end side of the transmission case 3 increases, so that the first oil outlet part 91, the second oil outlet port 92, and the third oil outlet port 93 remain entering the lubricating oil.

Similarly, if the transmission case 3 enters an inclined state where a left end side in the vehicle body left-right direction is lowered, the lubricating oil staying in the interior of the transmission case 3 flows from the a right end side of the transmission case 3 (the side where the first oil outlet port 91, the second oil outlet port 92, and the third oil outlet port 93 are located) toward the left end side of the transmission case 3 (the side opposite to the side where the first oil outlet port 91, the second oil outlet port 92, and the third oil outlet port 93 are located). Even if the lubricating oil flows toward the left end side of the transmission case 3, the amount of the lubricating oil staying on the left end side of the transmission case 3 becomes smaller under the presence of the first space zone A1 than in the cases where the first space zone A1 is not present. Consequently, the amount of the lubricating oil remaining on the left end side of the transmission case 3 decreases, and the amount of the lubricating oil remaining on the right end side of the transmission case 3 increases, so that the first oil outlet part 91, the second oil outlet port 92, and the third oil outlet port 93 remain entering the lubricating oil.

In the present embodiment, as illustrated in FIGS. 4 and 8, the first clutch CL1, the second clutch CL2, the third clutch CL3, and the fourth clutch CL4 (staged clutches) are disposed in the staged transmission part 19, and output of the planetary gear device 18A is inputted thereto. The first clutch CL1, the second clutch CL2, the third clutch CL3, and the fourth clutch CL4 are disposed displacedly to the side where the left sidewall portion 3g is located relative to the planetary gear device 18A, from portions closer to a side where the first oil outlet port 91, the second oil outlet port 92, and the third oil outlet port 93 are located, to the left end side of the transmission case 3 (the side where the first oil outlet port 91, the second oil outlet port 92, and the third oil outlet port 93 are located). The first space zone A1 is disposed toward the lateral side of the planetary gear device 18A at a location closer to the side where the planetary gear device 18A is located than the first clutch CL1, the second clutch CL2, the third clutch CL3, and the fourth clutch CL4, on the lateral side of the planetary gear device 18A. The first space zone A1 is disposed using a dead space formed between the planetary gear device 18A and the left sidewall portion 3g as an installation space for the first space zone A1.

[Other Embodiments]

(1) The foregoing embodiment exemplifies the case where the oil outlet ports (the first oil outlet port 91, the second oil outlet port 92, and the third oil outlet port 93) are disposed in the state of being located on the rear end side in the vehicle body front-back direction and on the right end side in the vehicle body left-right direction, and the first space zone A1 is disposed in the state of being located on the front end side in the vehicle body front-back direction and on the left end side in the vehicle body left-right direction, there is no intention to limit to this case. Alternatively, the oil outlet ports (the first oil outlet port 91, the second oil outlet port 92, and the third oil outlet port 93) may be disposed in the state of being located on the front end side in the vehicle body front-back direction and on the left end side in the vehicle body left-right direction, and the first space zone A1 may be disposed in the state of being located on the rear end side in the vehicle body front-back direction and on the right end side in the vehicle body left-right direction. Alternatively, the oil outlet ports (the first oil outlet port 91, the second oil outlet port 92, and the third oil outlet port 93) may be disposed in the state of being located on one end side (the front end side or the rear end side) only in the vehicle body front-back direction of the vehicle body front-back direction and the vehicle body left-right direction, and the first space zone A1 may be disposed in the state of being located on the other end side (the rear end side or the front end side) only in the vehicle body front-back direction of the vehicle body front-back direction and the vehicle body left-right direction. Alternatively, the oil outlet ports (the first oil outlet port 91, the second oil outlet port 92, and the third oil outlet port 93) may be disposed in the state of being located on one end side (the left end side or the right end side) only in the vehicle body left-right direction of the vehicle body front-back direction and the vehicle body left-right direction, and the first space zone A1 may be disposed in the state of being located on the other end side (the right end ide or the left end side) only in the vehicle body left-right direction of the vehicle body front-back direction and the vehicle body left-right direction (2) Although the foregoing embodiment exemplifies the case where the first space zone A1 is disposed on the lateral side of the planetary gear device 18A, there is no intention to limit thereto. The first space zone A1 may be disposed on any location.

(3) Although the foregoing embodiment exemplifies the case of including the three pieces of the first oil outlet port 91, the second outlet port 92, and the third outlet port 93, two or less, or four or more oil outlet ports may be included.

(4) Although the foregoing embodiment exemplifies the case of including the communication chamber 95, the communication chamber 95 may be omitted, and the oil outlet ports may directly open into the sidewall portion.

(5) Although the foregoing embodiment exemplifies the case of including the front wheels 6 and the rear wheels 7 as a traveling device, a crawler traveling device or a traveling device obtained by combining wheels and a mini crawler may be employed instead of the front wheels 6 and the rear wheels 7.

(6) Although the foregoing embodiment exemplifies the case of disposing the engine 1, only an electric motor, or both the engine 1 and the electric motor may be employed as the power source.

INDUSTRIAL APPLICABILITY

The present invention is applicable to a work vehicle including oil outlet ports which open into the bottom portion on one end side in the vehicle body front-back direction of the transmission case that contains the gear transmission therein, and which are configured to take out the lubricating oil from the interior of the transmission case.

REFERENCE SIGNS LIST

1 Engine (power source)
3 Transmission case
3d Right sidewall portion (sidewall portion)
3e Bottom portion
3f Internal space
3g Left sidewall portion (sidewall portion)
6 Front wheels (traveling devices)
7 Rear wheels (traveling devices)
15M Gear transmission
18A Planetary gear device
22 Rear wheel differential mechanism (differential mechanism)
91 First oil outlet port (oil outlet port at lower portion)
92 Second oil outlet port (oil outlet port at upper portion)
93 Third oil outlet port (oil outlet port at lower portion)
94 Communication chamber formation member
95 Communication chamber
96 First communication hole (communication hole)
97 Second communication hole (communication hole)
100 Partition part
A1 First space zone
A2 Second space zone
CL1 Staged clutch (clutch)
CL2 Staged clutch (clutch)
CL3 Staged clutch (clutch)
CL4 Staged clutch (clutch)

The invention claimed is:

1. A work vehicle comprising:
a gear transmission configured to vary power from a power source and output the power to a traveling device;
a transmission case containing the gear transmission; and
an oil outlet port opening to a bottom portion in one end side of the transmission case in a vehicle body front-back direction, the oil outlet port being configured to take out a lubricating oil from an interior of the transmission case, wherein
the work vehicle includes a partition part dividing an internal space of the transmission case into a first space zone along a sidewall portion of the transmission case, and a second space zone other than the first space zone on another end side in the vehicle body front-back direction of the transmission case, the partition part keeping the first space zone in a sealed state,
the oil outlet port is disposed at an upper portion and a lower portion in the bottom portion;
the bottom portion includes a communication chamber formation member disposed on an outer surface of a sidewall portion of the transmission case, the communication chamber formation member being configured to form a communication chamber between itself and the sidewall portion;
the oil outlet port at the upper portion opens to an upper portion of the communication chamber formation member;
the oil outlet port at the lower portion opens to a lower portion of the communication chamber formation member; and
a communication hole allowing the communication chamber to communicate with an internal space of the transmission case opens to a portion of the sidewall portion which is opposed to the oil outlet port at the lower portion.

2. The work vehicle according to claim 1, wherein:
the gear transmission includes
a planetary gear device configured to vary power from the power source and output the power, and
a clutch disposed displacedly to a side where the sidewall portion is located relative to the planetary gear device, on a location closer to a side where the oil outlet port is located than the planetary gear device, output of the planetary gear device being inputted to the clutch; and
the first space zone is disposed at a location located on a lateral side of the planetary gear device, on a location closer to a side where the planetary gear device is located than the clutch.

3. The work vehicle according to claim 1, wherein a differential mechanism configured to transmit output of the gear transmission to the traveling device is contained on one end side of the transmission case in the vehicle body front-back direction.

4. A work vehicle comprising:
a gear transmission configured to vary power from a power source and output the power to a traveling device;
a transmission case containing the gear transmission; and
an oil outlet port opening to a bottom portion in one end side of the transmission case in a vehicle body left-right direction, the oil outlet port being configured to take out a lubricating oil from an interior of the transmission case, wherein
the work vehicle includes a partition part dividing an internal space of the transmission case into a first space zone along a sidewall portion of the transmission case, and a second space zone other than the first space zone on another end side in the vehicle body left-right direction of the transmission case, the partition part keeping the first space zone in a sealed state,
the oil outlet port is disposed at an upper portion and a lower portion in the bottom portion;
the bottom portion includes a communication chamber formation member disposed on an outer surface of a sidewall portion of the transmission case, the communication chamber formation member being configured to form a communication chamber between itself and the sidewall portion;

the oil outlet port at the upper portion opens to an upper portion of the communication chamber formation member;

the oil outlet port at the lower portion opens to a lower portion of the communication chamber formation member; and a communication hole allowing the communication chamber to communicate with an internal space of the transmission case opens to a portion of the sidewall portion which is opposed to the oil outlet port at the lower portion.

5. A work vehicle comprising:

a gear transmission configured to vary power from a power source and output the power to a traveling device;

a transmission case containing the gear transmission; and an oil outlet port opening to a bottom portion in one end side of the transmission case in a vehicle body front-back direction and in a vehicle body left-right direction, the oil outlet port being configured to take out a lubricating oil from an interior of the transmission case, wherein the work vehicle includes a partition part dividing an internal space of the transmission case into a first space zone along a sidewall portion of the transmission case, and a second space zone other than the first space zone on another end side of the transmission case in the vehicle body front-back direction and the vehicle body left-right direction, the partition part keeping the first space zone in a sealed state, the oil outlet port is disposed at an upper portion and a lower portion in the bottom portion;

the bottom portion includes a communication chamber formation member disposed on an outer surface of a sidewall portion of the transmission case, the communication chamber formation member being configured to form a communication chamber between itself and the sidewall portion;

the oil outlet port at the upper portion opens to an upper portion of the communication chamber formation member;

the oil outlet port at the lower portion opens to a lower portion of the communication chamber formation member; and a communication hole allowing the communication chamber to communicate with an internal space of the transmission case opens to a portion of the sidewall portion which is opposed to the oil outlet port at the lower portion.

\* \* \* \* \*

UNITED STATES PATENT AND TRADEMARK OFFICE
CERTIFICATE OF CORRECTION

PATENT NO. : 12,135,075 B2  
APPLICATION NO. : 17/987296  
DATED : November 5, 2024  
INVENTOR(S) : T. Tsuchida et al.

Page 1 of 1

It is certified that error appears in the above-identified patent and that said Letters Patent is hereby corrected as shown below:

On the Title Page

Item (56) Foreign Documents, Column 2, Line 2, please change "2014 204 088 A1" to -- 10 2014 204 088 A1 --

Signed and Sealed this  
Fifteenth Day of April, 2025

Coke Morgan Stewart  
*Acting Director of the United States Patent and Trademark Office*